(12) United States Patent
Okanaka et al.

(10) Patent No.: US 7,540,479 B2
(45) Date of Patent: Jun. 2, 2009

(54) VIBRATION DAMPING DEVICE

(75) Inventors: Takehiro Okanaka, Kasugai (JP); Kouichi Maeda, Kasugai (JP); Tsutomu Matsuoka, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 283 days.

(21) Appl. No.: 11/676,665

(22) Filed: Feb. 20, 2007

(65) Prior Publication Data

US 2007/0228624 A1 Oct. 4, 2007

(30) Foreign Application Priority Data

Mar. 30, 2006 (JP) ............... 2006-092875

(51) Int. Cl.
*F16M 1/00* (2006.01)
(52) U.S. Cl. ............ 267/140.3; 267/141; 267/141.4; 267/140.11
(58) Field of Classification Search ............ 267/140.13, 267/140.3, 140.4, 141, 141.1, 141.2, 141.4, 267/140.12, 219, 292, 293, 140.5, 140.11; 248/636, 562
See application file for complete search history.

(56) References Cited

U.S. PATENT DOCUMENTS 4,660,797 A * 4/1987 Tonnies ............ 267/141
4,840,359 A * 6/1989 Hamaekers et al. .... 267/140.12
5,547,172 A * 8/1996 Corcoran ............ 267/140.13
2005/0217918 A1 10/2005 Endo

FOREIGN PATENT DOCUMENTS

| JP | 06-020679 Y2 | 6/1994 |
| JP | 2848399 B2 | 1/1999 |
| JP | 2001-191800 A1 | 7/2001 |

\* cited by examiner

*Primary Examiner*—Melanie Torres
(74) *Attorney, Agent, or Firm*—Burr & Brown

(57) ABSTRACT

There is provided a vibration damping device including; a pair of rubber arm portions connecting an inner fitting and an outer fitting to each other in the horizontal direction; and a rubber leg portion connecting in the vertical direction; the paired rubber arm portions are formed so that the thickness thereof decreases gradually from the inner fitting side toward the outer fitting side, and the rubber leg portion is formed so that each of both side surfaces is formed by an inwardly depressed curved surface, and is formed into a curved broaden shape toward the outer fitting side. Thereby, a spring constant in the horizontal direction is increased advantageously while a spring constant in the vertical direction kept large, and the durability of the rubber elastic body can be increased effectively.

6 Claims, 4 Drawing Sheets

VIBRATION DAMPING DEVICE

The present application is based on Japanese Patent Application No. 2006-092875 filed on Mar. 30, 2006, the contents of which are incorporated herein by reference.

BACKGROUND OF THE INVENTION

1. Field of the Invention

The present invention relates to a vibration damping device. More particularly, it relates to an improvement structure of a vibration damping device which is suitably used as an engine mount, in which an inner fitting and an outer fitting disposed separately on the outside of the inner fitting are connected to each other by a rubber elastic body substantially having a T shape as a whole.

2. Description of the Related Art

As a vibration damping connector or a vibration damping support interposed between members constituting a vibration transmission system, a vibration damping device having a construction such that an inner fitting attached to one member and an outer fitting attached to the other member, which is arranged separately on the outside of the inner fitting, are connected to each other by a rubber elastic body has been used to shut off or reduce vibrations transmitted between both of the members. To such a vibration damping device, not only a vibration load from one direction but also vibration loads from other directions are applied. Therefore, various constructions capable of responding to a plurality of vibration applications have been studied.

As one of vibration damping devices having such constructions responding to the plurality of vibration applications, US 2005/0217918 A1 proposes an engine mount having a construction such that in a vibration damping device arranged so as to match the axial direction of the vibration damping device to the right and left direction of a vehicle because of a vehicle space etc., an inside element, which is an inner fitting, and a cylindrical outside element, which is an outer fitting, arranged separately on the outside of the inside element are connected to each other by a rubber elastic body; the rubber elastic body is forked into two branches on the outside element inner peripheral surface side by a void extending in the axial direction to take an inverse V shape; and further the void is extended to a side rubber elastic body connecting a flange portion provided on one end side in the axial direction of the inside element to a flange portion of the outside element provided so as to face the flange portion of the inside element so that a spring constant in the right and left direction (axial direction) of the vehicle can be set independently of the vertical and longitudinal spring constants of the vehicle, by which the ratio (spring ratio) of three-directional spring constants (Ks) in the up and down direction, front and rear direction, and right and left direction of the vehicle can easily be designed so as to have a desired value. Even in such a mount construction, a load in the vertical direction, which is the up and down direction of the vehicle, can be supported mainly due to compressive deformation action by the inverse V shape of the rubber elastic body, so that a relatively large spring constant can be realized. However, in the horizontal direction, which is the front and rear direction of the vehicle, the inverse V-shaped rubber elastic body supports an applied load by means of shear deformation, so that it is difficult to increase the spring constant. Therefore, it is remarkably difficult to regulate great oscillatory motion in the front and rear direction of the vehicle in a large-size power plant (engine). In order to regulate such oscillatory motion in the front and rear direction of the vehicle, it is necessary to further increase the spring constant (Ks) in the horizontal direction of the mount corresponding to the front and rear direction of the vehicle. Moreover, it is necessary to realize the increase of the horizontal spring constant while the spring constant in the up and down direction of the vehicle is kept stable.

On the other hand, JP-U-B-6-20679 and JP-A-2001-191800 propose an engine mount having a construction such that a rubber elastic body connecting an inner fitting to an outer fitting consists of a pair of rubber arm portions, which are positioned so as to extend in the horizontal direction in almost equal thickness on both right and left sides with the inner fitting disposed therebetween to connect the inner fitting to the outer fitting in the horizontal direction, and a rubber leg portion, which is separated via a currant portion (cavity portion) provided between the paired rubber arm portions and the rubber leg portion, which supports the inner fitting and the outer fitting in a connecting or contacting manner in the up and down direction (vertical direction) perpendicular to the horizontal direction, so that the rubber elastic body substantially has a T shape. In this construction, the rubber elastic body is only intended to regulate and absorb a relative vertical vibration (load) between the inner fitting and the outer fitting. The paired rubber arm portions provided on both right and left sides of the inner fitting merely take shearing stresses, and are not considered as a construction for supporting a vibration (load) applied in the horizontal direction. Therefore, this engine mount has a problem that the usage durability thereof is poor.

In the above-described mount having the construction such that the inner fitting and the outer fitting are connected to each other by the rubber elastic body having a T shape as a whole, when a vibration load is applied in the horizontal direction and acts on the paired rubber arm portions, which are the head portion of the T-shaped rubber elastic body, stresses concentrate in the vicinity of a connecting portion of the rubber arm portion to the inner fitting. Therefore, in this construction, a crack and a fracture etc. are liable to be generated, which causes a problem of deteriorating the durability of rubber elastic body. Also, in this construction, in the rubber leg portion, which is the leg portion of the T shape of the rubber elastic body, as well, in the case where the inner fitting and the outer fitting are connected in a substantially equal thickness or merely connected so that the side surface assumes a linear trapezoidal shape, the rubber leg portion may be buckled if a high load is applied in the up and down direction. In addition, it is difficult to sufficiently absorb the deformation of the rubber leg portion. Therefore, this construction has a problem of generating a crack and a fracture etc., and thereby the durability of the rubber leg portion is deteriorated.

SUMMARY OF THE INVENTION

The present invention has been made in view of the situation described above, and accordingly an object of the present invention is to provide a vibration damping device having a construction such that an inner fitting and an outer fitting are connected to each other by a rubber elastic body, in which a spring constant in the horizontal direction is increased advantageously while a spring constant in the vertical direction is kept large, and the durability of the rubber elastic body can be increased effectively.

To achieve the above object, there is provided an vibration damping device in accordance with the principle of the preset invention, comprising: an inner fitting; an outer fitting disposed separately on the outside of the inner fitting and surrounding the inner fitting; and a rubber elastic body elastically connecting the inner fitting and the outer fitting, and having a pair of rubber arm portions which is positioned on both right and left sides of the inner fitting and the outer fitting to each other in a horizontal direction, and a pair of rubber arm portions by voids provided between arm portions and connects the inner fitting and the outer fitting to each other in a vertical direction; wherein the paired rubber arm portions are formed so that the thickness thereof decreases gradually from the inner fitting side toward the outer fitting side, and the rubber leg portion is formed so that each of both side surfaces has an inwardly depressed curved surface, and is formed into a curved broaden shape toward the outer fitting side.

According to one of preferable modes of the vibration damping device in accordance with the present invention, the paired rubber arm portions have a fixing distance in the axial direction with respect to the outer fitting longer than a connecting distance between the inner fitting and the outer fitting respectively.

According to another one of preferable modes of the vibration damping device in accordance with the present invention, each of the paired rubber arm portions has both side surfaces formed by inwardly depressed curved surfaces.

According to still another one of preferable modes of the vibration damping device in accordance with the present invention, the inner fitting has a flange portion integrally provided in one end portion in the axial direction thereof, the flange portion extending toward the outer fitting side and facing to the end portion of the outer fitting with a predetermined distance being provided, and the flange portion is fixed to a side surface facing to the rubber leg portion, and a part of the rubber leg portion is interposed between the flange portion and the end portion of the outer fitting.

In addition, in the present invention, a construction is preferably adopted in which the outer fitting has a rectangularly tubular shape such that a part of an inner surface shape in a circumferential direction is formed by a semicircular or arcuate curved shape portion, and the rubber leg portion is fixed to the curved shape portion of the rectangularly tubular shape, and the paired rubber arm portions are fixed to parallel portions extending in parallel with each other from both ends of the curved shape portion.

According to different one of preferable modes of the present invention, a stopper is further provided on a portion of the outer fitting corresponding to the inner fitting to regulate a relatively excessive displacement in the horizontal direction of the inner fitting.

Accordingly, in the vibration damping device in accordance with the present invention, since the inner fitting and the outer fitting are connected to each other by the substantially T-shaped rubber elastic body made up of the paired rubber arm portions and the rubber leg portion, the device is subjected to compressive deformation action by loads applied in two orthogonal directions, the horizontal direction and the vertical direction, based on the T shape of the rubber elastic body. Therefore, the spring constants in these two directions can be increased effectively at the same time. Moreover, since the rubber arm portion, which is the head portion of the T-shaped rubber elastic body, is formed so that the thickness thereof decreases gradually from the inner fitting side toward the outer fitting side, the paired rubber arm portions are easily shear deformed by a load applied in the vertical direction, no great influence is exerted on the spring constant in the vertical direction that is regulated by the rubber leg portion, which is the leg portion of the T shape, and the tuning of the spring constant is made easy. Also, regarding the load applied in the horizontal direction, since the paired rubber arm portions are easy to deform in the connection side portion with the outer fitting, in which the thickness is decreased, stresses are distributed and uniformed, by which the occurrence of defects such as cracks and fractures is restrained or prevented effectively, and the durability of the paired rubber arm portions can be improved advantageously.

Also, in the vibration damping device in accordance with the present invention, the rubber leg portion of the rubber elastic body, subjected to the vertical load, is formed so that each of both side surfaces of the rubber leg portion is formed by an inwardly depressed curved surface, and is formed into a curved broaden shape toward the outer fitting side. Therefore, even if a high load acts and the rubber leg portion is compressedly deformed, the buckling of the rubber leg portion can be prevented effectively. Moreover, since both side surfaces are not formed by linear flat surfaces but formed by inwardly curved surfaces, the free length is long. Thereby, the applied stresses are distributed and uniformed, and hence the side surface of the rubber leg portion is deformed easily. Therefore, effective improvement in the durability can be achieved advantageously.

Thereupon, in the vibration damping device according to the present invention, while the spring constants of the rubber elastic body in the two orthogonal directions, the vertical direction and the horizontal direction, are increased, at the same time, the spring constant ratio of the rubber elastic body can be tuned easily, and also the occurrence of defects in the rubber elastic body is prevented or restrained, by which the durability can be increased advantageously.

DETAILED DESCRIPTION OF THE PREFERRED EMBODIMENT

To clarify the present invention further specifically, an embodiment of the present invention will now be described with reference to the accompanying drawings.

Figure 1:
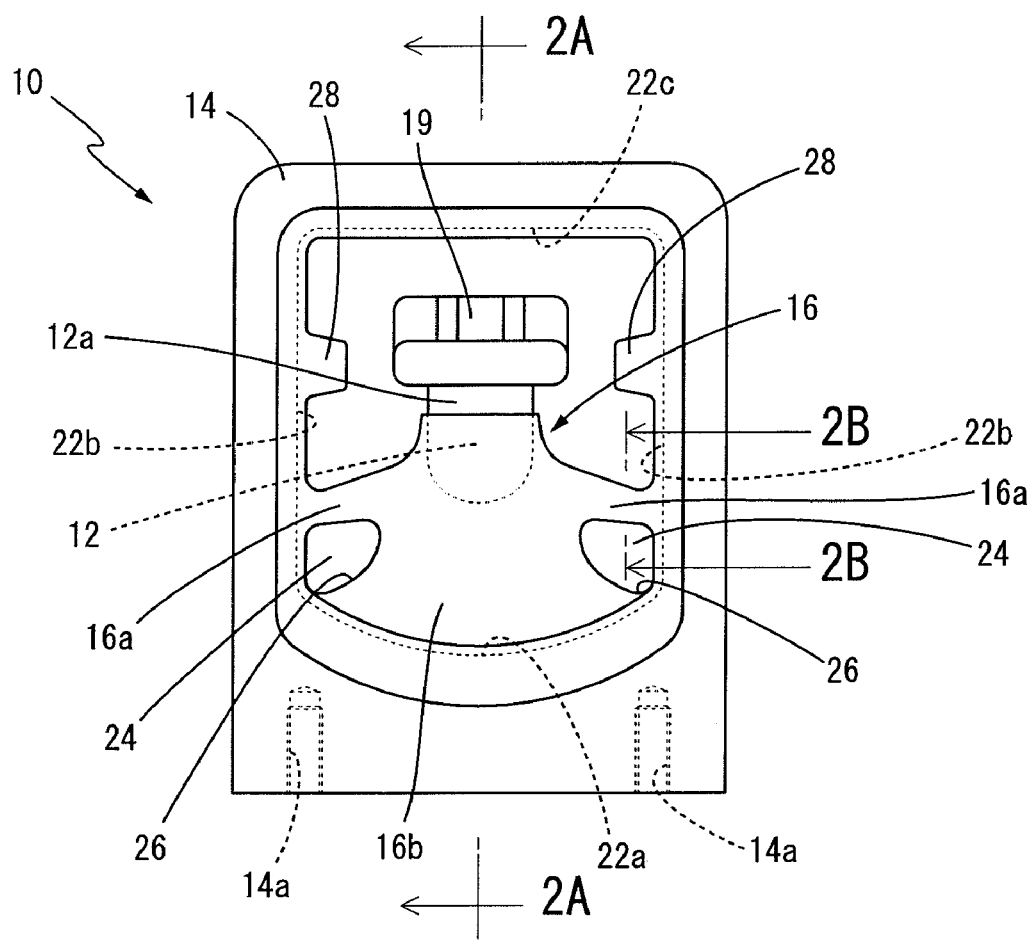
FIG. 1 is a front view showing one embodiment of a vibration damping device having a construction in accordance with the present invention.
Figure 2A:
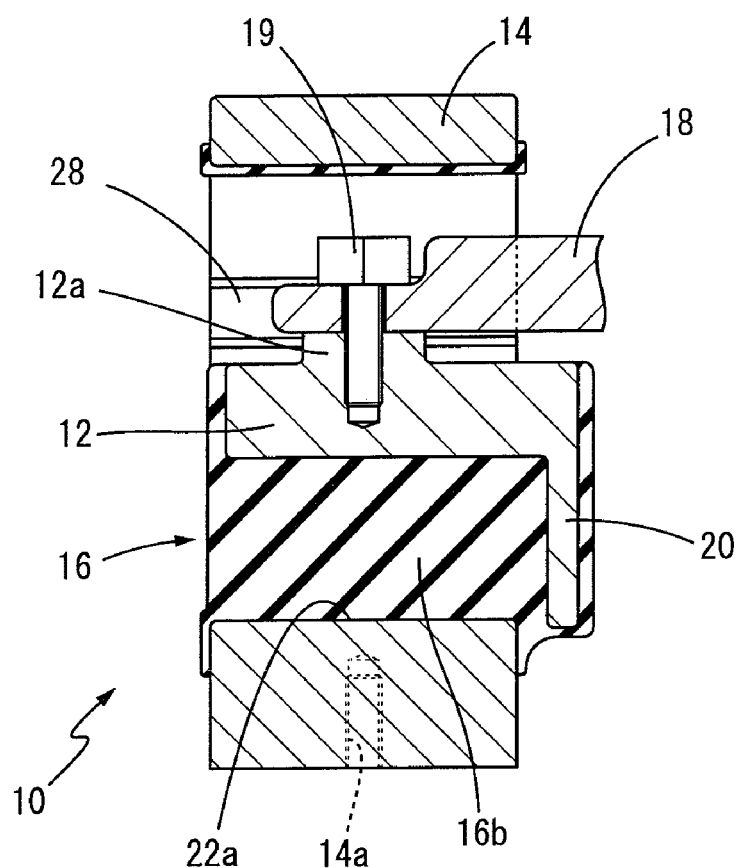
FIG. 2 is sectional views of the vibration damping device shown in FIG. 1, FIG. 2A being a sectional view taken along the line 2A-2A of FIG. 1, and FIG. 2B being a sectional view taken along the line 2B-2B of FIG. 1.
Figure 2B:
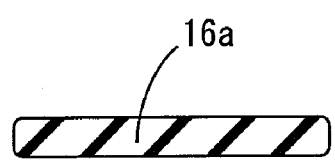
Figure 3:
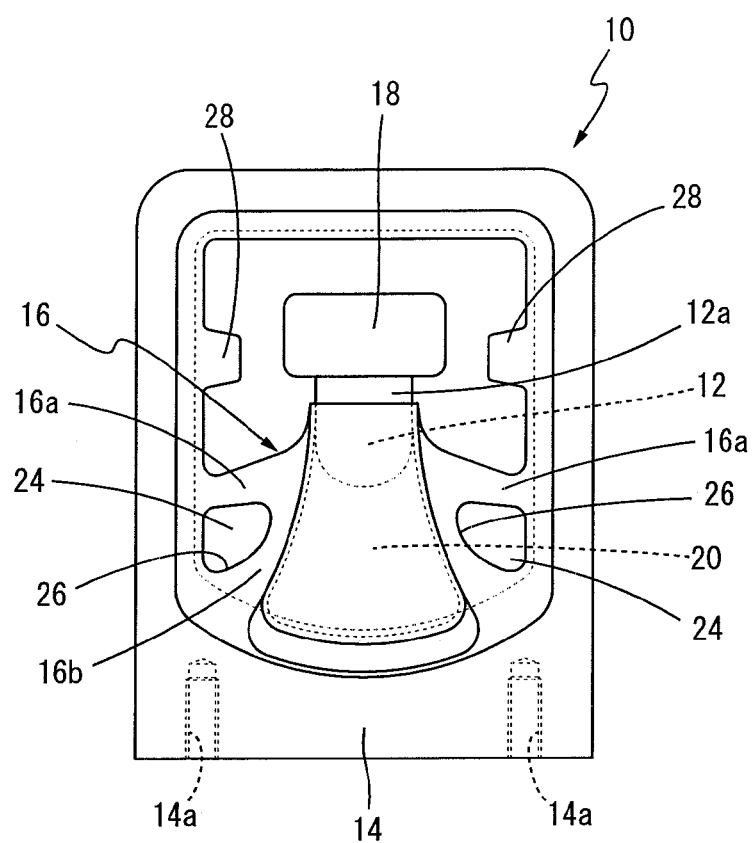
FIG. 3 is a back view of the vibration damping device shown in FIG. 1.

FIGS. 1 to 3 show an engine mount 10, which is one embodiment of a vibration damping device in accordance with the present invention. In FIG. 1, the engine mount 10 has a semi-columnar inside element 12 extending in the axial direction perpendicular to the drawing sheet surface of FIG. 1, as an inner fitting, and also has an outer cylindrical element 14 having a rectangular cylindrical shape formed by combining a rectangle and an arcuate shape, in which the inside element 12 is located in the inside space, as an outer fitting separately located on the outside of the inside element 12. Further, the inside element 12 and the outer cylindrical element 14 are connected by a rubber elastic body 16, having approximately T-shape in the cross section perpendicular to the axial direction, so that the inside element 12 is supported in the inside space of the outer cylindrical element 14 in a state of being separated a predetermined distance from the inner surface of the outer cylindrical element 14. A mounting bracket 18 inserted from the outside in the axial direction and arranged in the outer cylindrical element 14 is fixed to the inside element 12 by a bolt 19 as shown in FIG. 2.

The above-described engine mount 10 is arranged so that the rubber elastic body 16 is located on the lower side in the up and down direction in such a manner that, for example, the axial direction (in FIG. 1, the direction perpendicular to the drawing sheet surface) of the engine mount 10 is positioned in right and left direction of a vehicle, the right and left direction (the horizontal direction) in FIG. 1 is the front and rear direction of the vehicle, and the up and down direction (the vertical direction) in FIG. 1 is the up and down direction of the vehicle. The inside element 12 is mounted on the engine side via the mounting bracket 18 fixed to the inside element 12 by the bolt 19, and the outer cylindrical element 14 is attached to the vehicle body side in the lower part thereof, by which the outer cylindrical element 14 itself is configured so as to be also used as the vehicle body-side bracket. Therefore, in this embodiment, the engine mount 10 is attached between the engine-side member and the vehicle body-side member of the vehicle so that the transmission of vibrations therebetween, specifically, vibrations in the up and down direction, the right and left direction, and the front and rear direction of the vehicle can be shut off or reduced (transmission is restrained).

In the above-described engine mount 10, the inside element 12 is an element having a semi-columnar shape the upper portion of which is cut, and is arranged in the inside space of the outer cylindrical element 14 so that the cut flat surface is on the upper side. As shown in FIG. 2, the mounting bracket 18 assembled from the transverse direction is fixed to a mounting convex portion 12*a* having a predetermined height by the bolt 19, the mounting convex portion 12*a* projecting integrally from the flat upper surface of the inside element 12, so that a vibration load from one member (herein, the engine-side member) attached via the mounting bracket 18 is applied. Also, as is apparent from FIG. 2A and FIG. 3, a flange portion 20 is integrally provided in the right end portion in FIG. 2A, which is one end portion in the axial direction of the inside element 12. The flange portion 20 extending with a predetermined width greater than the inside element 12 (refer to FIG. 3) and faces to the end portion of the outer cylindrical element 14 with a predetermined distance being provided. Further, the flange portion 20 is fixed to the side surface, which is the end surface in the axial direction, of the rubber elastic body 16, and the flange portion 20 and the rubber elastic body 16 are connected to each other in a state in which a part of the rubber elastic body 16 is interposed between the flange portion 20 and the end surface in the axial direction of the outer cylindrical element 14. The inside element 12 is integrally formed by die-casting etc. of an aluminum alloy as in the conventional example.

Like the inside element 12, the outer cylindrical element 14 is integrally formed by die-casting etc. of an aluminum alloy. As shown in FIG. 1, the outer cylindrical element 14 has a rectangularly tubular shape as a whole, and a part of the inner surface in the circumferential direction is an arcuate curve-shaped portion 22*a*. Straight portions 22*b*, 22*b* extending in parallel with each other from both ends of the curve-shaped portion 22*a* are provided, and further a semi-rectangular portion 22*c* connecting the straight portions 22*b*, 22*b* is provided. Thus, the inner peripheral surface shape of the outer cylindrical element 14 having a rectangularly tubular shape is formed by the curve-shaped portion 22*a*, the straight portions 22*b*, 22*b* and the semi-rectangular portion 22*c*. In the lower parts of the outer cylindrical element 14, bolt holes 14*a* that are open to the bottom surface are provided so that the vibration damping device 10 is fixed by bolts to the other member (herein, the vehicle body-side member) transmitting vibrations via the bolt holes 14*a*.

As is apparent from FIG. 1 and FIG. 3, the rubber elastic body 16 is made up of a pair of rubber arm portions 16*a*, 16*a* and a rubber leg portion 16*b*. The rubber arm portions 16*a* are located on both right and left sides with the inside element 12 held therebetween, and connect the inside element 12 to the outer cylindrical element 14 in the horizontal direction (in the Figures, the right and left direction). The rubber leg portion 16*b* is separated via voids 24, 24 provided between the paired rubber arm portions 16*a*, 16*a* and the rubber leg portion 16*b*, and connects the inside element 12 to the outer cylindrical element 14 in the vertical direction (in the Figures, the up and down direction). Therefore, the rubber elastic body 16 has a T shape with a great leg width as a whole.

As shown in FIG. 1 and FIG. 3, each of the paired rubber arm portions 16*a*, 16*a* of the rubber elastic body 16 is formed so that the thickness thereof decreases gradually from the inside element 12 side to the outer cylindrical element 14 side, and the thin-wall tip end portion is fixed to the straight portion 22*b* of the outer cylindrical element 14. Thereby, the rubber elastic body 16 is made easy to move when a shearing load is applied to a portion near the connecting portion with the outer cylindrical element 14, and the connecting portion side with the outer cylindrical element 14 is made to be weak by thin-wall shape being tapered, so that the stress concentration on the inner element 12 side can be avoided when a compressive load is applied. The paired rubber arm portions 16*a*, 16*a* can be positioned so as to extend in the horizontal direction, which is the right and left direction in FIG. 1 and FIG. 3, when the engine mount 10 is attached to the vehicle and the initial load is applied to between the inside element 12 and the outer cylindrical element 14.

As shown in FIG. 1 and FIG. 3, the rubber leg portion 16*b* corresponding to the leg portion of the T shape in the rubber elastic body 16 is separated from the paired rubber arm portions 16*a*, 16*a* by the voids 24, 24 being provided between the paired rubber arm portions 16*a*, 16*a* and penetrating or passing through the rubber elastic body 16 in the axial direction on both sides of the flange portion 20, and is formed into an inwardly depressed curved surface 26, a curved broaden shape extending toward the outer cylindrical element 14 with a greater width than the inside element 12, and the rubber leg portion 16*b* is fixed to the curve-shaped portion 22*a* of the inner peripheral surface of the outer cylindrical member 14. Therefore, the rubber leg portion 16*b* can mainly support a load in the up and down direction in FIG. 1.

Thus, both side surfaces of the rubber leg portion 16*b* defined by the shapes of the voids 24, 24 penetrating the rubber elastic body 16, provided between the corresponding paired rubber arm portions 16*a*, 16*a* and the rubber leg portion 16*b*, are formed by inwardly depressed curved surfaces 26, 26 formed so as to curve over the total length in the up and down direction, by which the free length in the up and down direction of both side surfaces of the rubber leg portion 16*b* is made long. Thereby, the distribution and uniformity of stresses can be achieved effectively. Also, at the same time, buckling deformation can be restrained or prevented more effectively.

As shown in FIG. 2A, the flange portion 20 of the inside element 12 is fixed on the end surface of the rubber leg portion 16*b* in the axial direction of the engine mount 10, and a part of the rubber leg portion 16*b* is interposed between the axial end surface of the outer cylindrical element 14 and the flange portion 20 to hold the part of the rubber leg portion 16*b* therebetween. Thereby, when a vibration load is applied in the right and left direction in FIG. 2A, in other words, in the mount axis direction, the load can be supported by the compressive deformation action. Therefore, a large spring constant can be realized.

As shown in FIG. 1, in the upper parts of the straight portions 22b, 22b on both sides of the outer cylindrical element 14, stoppers 28, 28 consisting of the rubber elastic body are provided so as to be positioned opposedly on both right and left sides of the mounting bracket 18 fixed to the inside element 12 by the bolt 19. Therefore, an excessive displacement in the right and left direction of the mounting bracket 18, in other words, an excessive displacement in the right and left direction of the inside element 12 can be prevented by the abutment on the right and left stoppers 28, 28.

The rubber elastic body 16 (the rubber arm portions 16a, 16a plus the rubber leg portion 16b) and the stoppers 28 are formed appropriately by the conventionally known molding process using various rubber materials. For example, the inside element 12 and the outer cylindrical element 14 are set in a mold, and a rubber material is vulcanizedly molded, by which the rubber elastic body 16 and the stoppers 28 can be formed at the same time as an integral vulcanizedly molded product, and the engine mount 10 can be obtained as an integral object. Also, by the vulcanized molding operation, as shown in the figures, a coating layer over the whole surface of the inner peripheral surface of the outer cylindrical element 14 is formed simultaneously, and further the coating layer can easily be turned to the end surface of the outer cylindrical element 14. Further, on the outer surface of the flange portion 20 provided integrally with the inside element 12 as well, a coating layer having a predetermined thickness is formed so as to be turned from the rubber leg portion 16b.

Thereupon, in the engine mount 10 constructed as described above, if a load such as a vibration load is applied to between the inside element 12 and the outer cylindrical element 14 in the up and down direction in FIG. 1 (the vertical direction) corresponding to the up and down direction of the vehicle, since the rubber leg portion 16b of the rubber elastic body 16 is formed into the curved broaden shape in which the width increases toward the lower tip end by both side surfaces 26, 26 formed by a curved surface, the load is supported by compressive deformation, so that a large spring constant (Ks) can be attained advantageously.

Since the rubber leg portion 16b extends in a broaden shape with a width greater than that of the inside element 12 and is fixed to the curve-shaped portion 22a curved in an arcuate shape, the supporting force of load can be achieved more effectively by the rubber leg portion 16b. Also, the spring constant attained by the above-described rubber leg portion 16b has a characteristic such that th spring constant of the engine mount 10 in the up and down direction of the vehicle can be tuned easily because the paired rubber arm portions 16a, 16a which are shear deformed, are made thinner toward the tip end thereof and thus are easily deformed on the outer cylindrical element 14 side.

In the above-described rubber leg portion 16b of the rubber elastic body 16, since both side surfaces thereof are formed by inwardly depressed curved surfaces and the rubber leg portion 16b is configured so as to have a curved broaden shape, the free length of the surface can be made long as compared with the case where the side surface is a surface extending linearly from the inside element 12 toward the outer cylindrical element 14. Therefore, at the time of compressive deformation of the rubber leg portion 16b, stresses are distributed and applied uniformly, so that stress concentration can be avoided advantageously. As a result, a decrease in durability caused by cracks and fractures, etc. produced on both side surfaces of the rubber leg portion 16b can also be restrained or avoided effectively.

If a load such as a vibration load is applied to between the inside element 12 and the outer cylindrical element 14 in the right and left direction in FIG. 1, corresponding to the front and rear direction of the vehicle, since the rubber elastic body 16 has the paired rubber arm portions 16a, 16a connecting the inside element 12 and the outer cylindrical element 14 to each other in the horizontal direction, a large spring constant (Ks) can be attained by the compressive deformation action of the paired rubber arm portions. Moreover, at this time, since the paired rubber arm portions 16a, 16a are connected to the straight portions 22b, 22b of the inner peripheral surface of the outer cylindrical element 14, a load can be applied uniformly and effectively to the paired rubber arm portions 16b, so that the shear deformation can be made further uniform. Further, when the paired rubber arm portions 16a, 16a are compressedly deformed, since the rubber leg portion 16b is formed into a curved broaden shape with a great width, some of the applied load in the right and left direction in FIG. 1 can also be supported by the rubber leg portion 16b, by which the spring constant in the right and left direction can further be increased.

Since the paired rubber arm portions 16a, 16a are formed so that the thickness thereof decreases gradually from the inside element 12 side toward the outer cylindrical element 14 side, stresses do not concentrate in the portion on the inside element 12 side and the thin-wall connecting portion on the outer cylindrical element 14 side is easy to deform, so that the stresses can be distributed effectively. Therefore, the production of cracks, fractures etc. in the paired rubber arm portions 16a, 16a can be restrained or prevented, and hence the durability of the paired rubber arm portions 16a, 16a can be improved.

Figure 4:
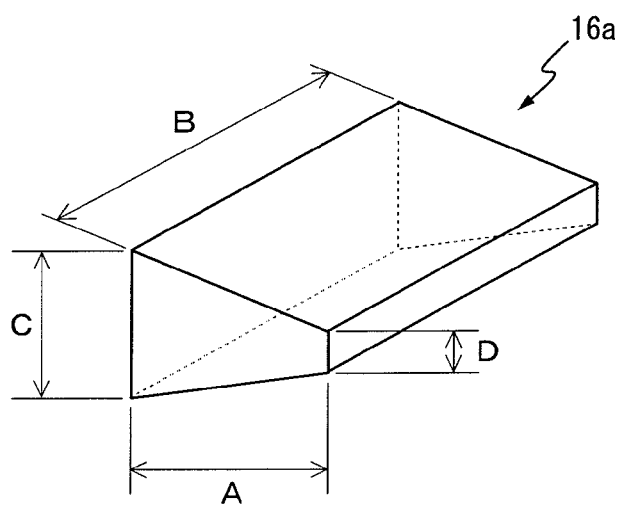
FIG. 4 is a perspective view schematically showing one rubber arm portion in the vibration damping device shown in FIG. 1.

In the engine mount described in this embodiment, for example, as schematically shown in FIG. 4, each of the paired rubber arm portions 16a, 16a constituting the rubber elastic body 16 is formed so that the thickness thereof decreases gradually from the inside element 12 side toward the outer cylindrical element 14 side in such a manner that in the up and down direction in FIG. 1, the connection length D on the outer cylindrical element 14 side is shorter than the connection length C on the inside element 12 side (C>D), and in addition, the fixing distance B in the axial direction with respect to the outer cylindrical element 14 is longer than the connecting distance A between the inside element 12 and the outer cylindrical element 14 (B>A). Thereby, the spring constant in the right and left direction can be increased more effectively while restraining the increase in spring constant in the up and down direction.

Figure 5:
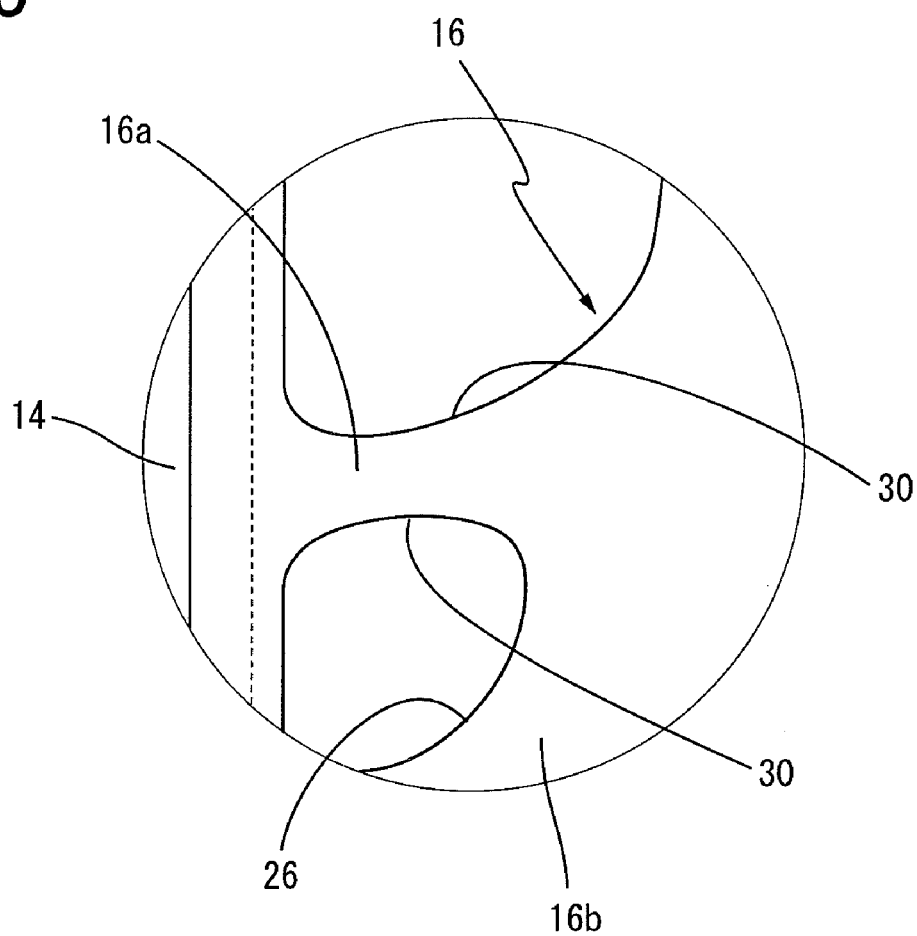
FIG. 5 is a partially enlarged front view showing the shape of a rubber arm portion in another example of a vibration damping device in accordance with the present invention.

Regarding the shapes of the paired rubber arm portions 16a, 16a in the embodiment shown in FIGS. 1 to 3, a mode in which linear flat surfaces are brought close to each other from both sides is adopted. However, as shown in FIG. 5, both side surfaces of the rubber arm portions 16a can be formed by inwardly depressed curved surfaces 30, and the curved surfaces 30, 30 on both sides can be brought close to each other so that the thickness decreases gradually toward the outer cylindrical element 14. Thereby, the distribution of stresses in the rubber arm portion 16a can be achieved effectively, and the durability of the rubber arm portion 16a can further be improved. Needless to say, in place of the formation of both side surfaces of the rubber arm portion 16a by the curved surfaces 30, 30 one side surface can be formed by the curved surface (30), and the other side surface can be formed linearly by a flat surface extending linearly toward the outer cylindrical element 14. In this case as well, the above-described operation and effects obtained by the formation of one side surface by the curved surface (30) can be achieved.

The above is a detailed description of a typical embodiment of the present invention. It should be understood that the above-described embodiment is merely a typical example, and the present invention is not construed limitedly by the specific description in the above-described embodiment.

For example, in the above-described embodiment, detailed explanation has been given by taking the engine mount (10) supporting orthogonal three-directional loads as an example. However, it is a matter of course that the present invention is not limited to the vibration damping device that supports three-directional loads, and it can be applied to a vibration damping device that supports at least two-directional loads, namely, a vibration damping device that supports loads in the directions including the horizontal direction and the vertical direction.

Regarding the construction and shape of the vibration damping device, in the above-described embodiment, the outer cylindrical element 14 having a rectangularly tubular shape in which one side of a rectangular shape has an arcuate shape is used as the outer fitting. However, the transverse cross-sectional shape of the outer cylindrical element 14 can be selected appropriately. A further complicated curved shape can be added, or a simple cylindrical shape or rectangularly tubular shape can be adopted. In addition, not only the shape showing a tubular mode, but also a U shape, a semi-elliptical shape, and the like that can surround at least three sides of the inner fitting can be adopted appropriately.

Further, in the above-described embodiment, as the inner fitting, the semi-columnar inside element 12 is used. However, the inside element of a columnar shape and further the inside element of a cylindrical shape such as a cylinder can be used.

The inner fitting and the outer fitting are attached to two members that transmit vibrations in the same construction as that of the conventional one. In attaching the inner fitting and the outer fitting, in the above-described embodiment, the inner fitting (the inside element 12) is fixed to the engine-side member, and the outer fitting (the outer cylindrical element 14) is fixed the vehicle body-side member. However, a reverse fixing mode may be adopted.

Besides, though every one is not mentioned, it is a matter of course that the present invention can be carried out in any embodiment in which various changes, modifications, and improvements are made based on the knowledge of the person skilled in the art, and such an embodiment is embraced in the scope of the present invention unless it departs from the purport of the present invention.

What is claimed is:

1. A vibration damping device, comprising:
   an inner fitting;
   an outer fitting disposed separately on the outside of the inner fitting and surrounding the inner fitting; and
   a rubber elastic body elastically connecting the inner fitting and the outer fitting, and having a pair of rubber arm portions which is positioned on both right and left sides of the inner fitting and the outer fitting to each other in a horizontal direction, and a pair of rubber arm portions by voids provided between arm portions and connects the inner fitting and the outer fitting to each other in a vertical direction;
   wherein the paired rubber arm portions are formed so that the thickness thereof decreases gradually from the inner fitting side toward the outer fitting side, and the rubber leg portion is formed so that each of both side surfaces has an inwardly depressed curved surface, and is formed into a curved broaden shape toward the outer fitting side.

2. The vibration damping device according to claim 1, wherein the paired rubber arm portions have a fixing distance in an axial direction with respect to the outer fitting longer than a connecting distance between the inner fitting and the outer fitting respectively.

3. The vibration damping device according to claim 1, wherein each of the paired rubber arm portions has both side surfaces formed by inwardly depressed curved surfaces.

4. The vibration damping device according to claim 1, wherein the inner fitting has a flange portion integrally provided in one end portion in the axial direction thereof, the flange portion extending toward the outer fitting side and facing to an end portion of the outer fitting with a predetermined distance being provided, and the flange portion is fixed to a side surface facing to the rubber leg portion, and a part of the rubber leg portion is interposed between the flange portion and the end portion of the outer fitting.

5. The vibration damping device according to claim 1, wherein the outer fitting has a rectangularly tubular shape such that a part of an inner surface shape in a circumferential direction is formed by a semicircular or arcuate curved shape portion, and the rubber leg portion is fixed to the curved shape portion of the rectangularly tubular shape, and the paired rubber arm portions are fixed to parallel portions extending in parallel with each other from both ends of the curved shape portion.

6. The vibration damping device according to claim 1, wherein a stopper is further provided on a portion of the outer fitting corresponding to the inner fitting to regulate a relatively excessive displacement in the horizontal direction of the inner fitting.

* * * * *